(No Model.) 3 Sheets—Sheet 1.

C. W. SALADEE.
TWO WHEELED VEHICLE.

No. 294,679. Patented Mar. 4, 1884.

Attest:
Court A Cooper
H. E. Hansmann

Cyrus W. Saladee
Inventor:
By Foster & Freeman
Attys.

N. PETERS. Photo-Lithographer, Washington, D. C.

(No Model.)  3 Sheets—Sheet. 2.

C. W. SALADEE.
TWO WHEELED VEHICLE.

No. 294,679.  Patented Mar. 4, 1884.

Attest:

Cyrus W. Saladee
Inventor:
By Foster & Freeman
Attys.

(No Model.)  3 Sheets—Sheet 3.

C. W. SALADEE.
TWO WHEELED VEHICLE.

No. 294,679.  Patented Mar. 4, 1884.

UNITED STATES PATENT OFFICE.

CYRUS W. SALADEE, OF TORRINGTON, CONNECTICUT.

TWO-WHEELED VEHICLE.

SPECIFICATION forming part of Letters Patent No. 294,679, dated March 4, 1884.

Application filed July 7, 1883. (No model.)

*To all whom it may concern:*

Be it known that I, CYRUS W. SALADEE, a citizen of the United States, and a resident of Torrington, in the county of Litchfield and State of Connecticut, have invented certain new and useful Improvements in Two-Wheeled Vehicles, of which the following is a specification.

My invention relates to two-wheeled vehicles; and it consists in the improved construction of the spring-platform and mode of attaching the shaft-frame or pole thereto, so as to regulate the "hang" of the body to carry it level and avoid vibrations, all as hereinafter fully set forth.

Figure 1:
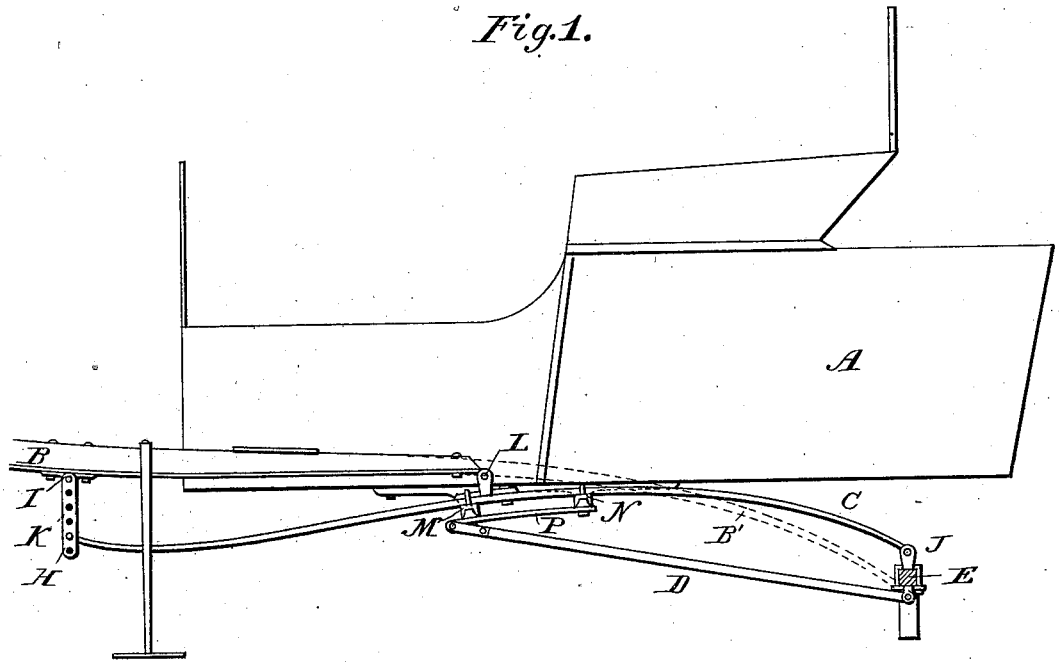
Figure 2:
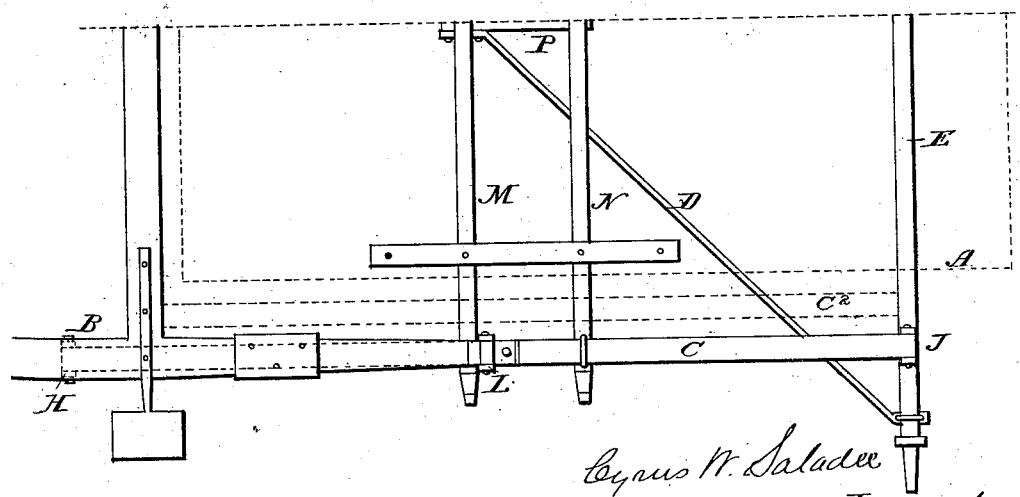

In the drawings, Figure 1 is a side elevation, and Fig. 2 a half plan view, of a two-wheeled vehicle embodying my invention. Figs. 3, 4, 5, and 6 are modifications.

Referring to Figs. 1 and 2, E is the axle, A the body, and B the shafts of the shaft-frame. Semi-elliptic side springs, C, are arranged on opposite sides of the body, having their rear ends pivotally connected to the axle, their center portions united from opposite sides by cross-bars M and N, or otherwise connected to support the body. The springs extend to the front of the body, and are connected, preferably by hanger-links H, with the shaft-frame. The rear ends of the shafts extend back on opposite sides of the body and shackle to the center portion of the side springs, C; or, if preferred, the shafts may reach back to the axle, as shown in dotted lines; but in this case the springs C would be inside the shafts, as in dotted lines C², Fig. 2, and their front ends would be attached to the cross-bar of the shaft-frame.

To maintain the axle in its vertical position, I use under braces or stays, D, preferably diagonally arranged, having their front ends pivoted to a center bar, P, and their rear ends shackled to the axle at widely-separated points.

The side springs, arranged as shown, serve to support the body in advance of the axle, thereby placing the wheels far enough back of the entrance-way to avoid any obstruction in getting in and out of the vehicle.

The front ends of the springs serve to take up vibrations, so as to prevent the transmission to the body of the motion of the horse, and the adjustable connection permits the body to be set level, whether a tall or small horse is used; furthermore, the great length of the side springs will secure for the body a long and easy motion.

To cheapen the construction of a vehicle, the axle-stays D and the cross-bars M and N may be omitted by extending the rear ends of the shafts back to the axle, as in dotted lines B', Fig. 1, securing them thereto rigidly, while the springs C are extended from their pivotal bearings J on the axle to the cross-bar in the shafts immediately inside the latter, as in dotted lines, Fig. 2, the body being supported directly on the center portion of the springs. The front ends of the springs would in this case be suspended from the cross-bar of the shafts by any suitable adjustable hanger.

Figure 3:
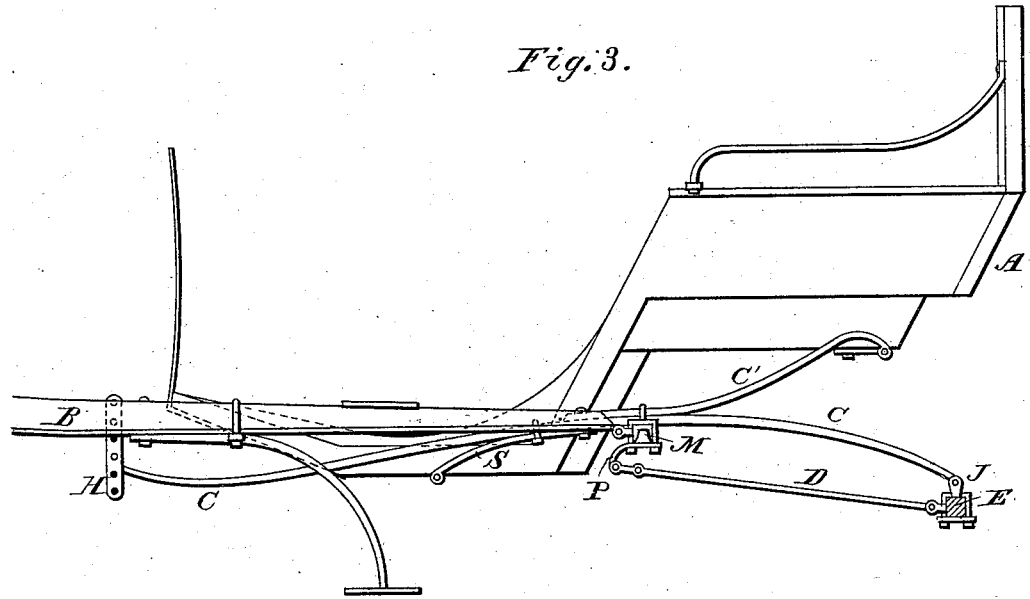
Figure 4:
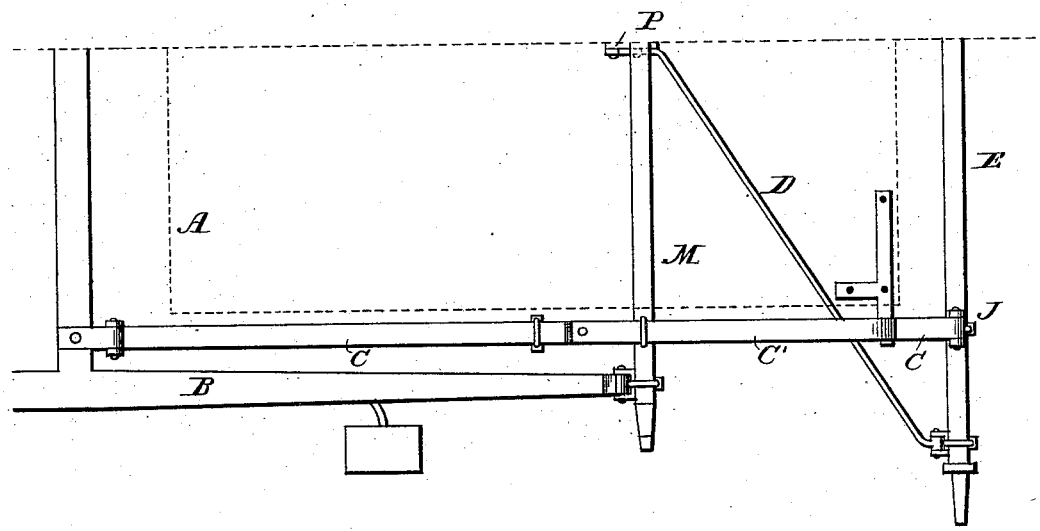

In Figs. 3 and 4 the arrangement of parts E C D B H is substantially the same as above shown and described; but in this modification the body has a phaeton or "drop front," and for the proper support of its elevated rear portion I secure to the top of the spring C, at or about its center portion, a rigid or spring brace, C', extended to the rear, and there connected with the body. To the under side of the spring I secure the arm S, which is bent down, and preferably pivotally secured to the drop-front of the body. In this case there is but one cross-bar, M, to the outer ends of which the rear ends of the shafts are shackled, the front ends of the springs being connected with the cross-bar of the shaft's frame.

Figure 5:
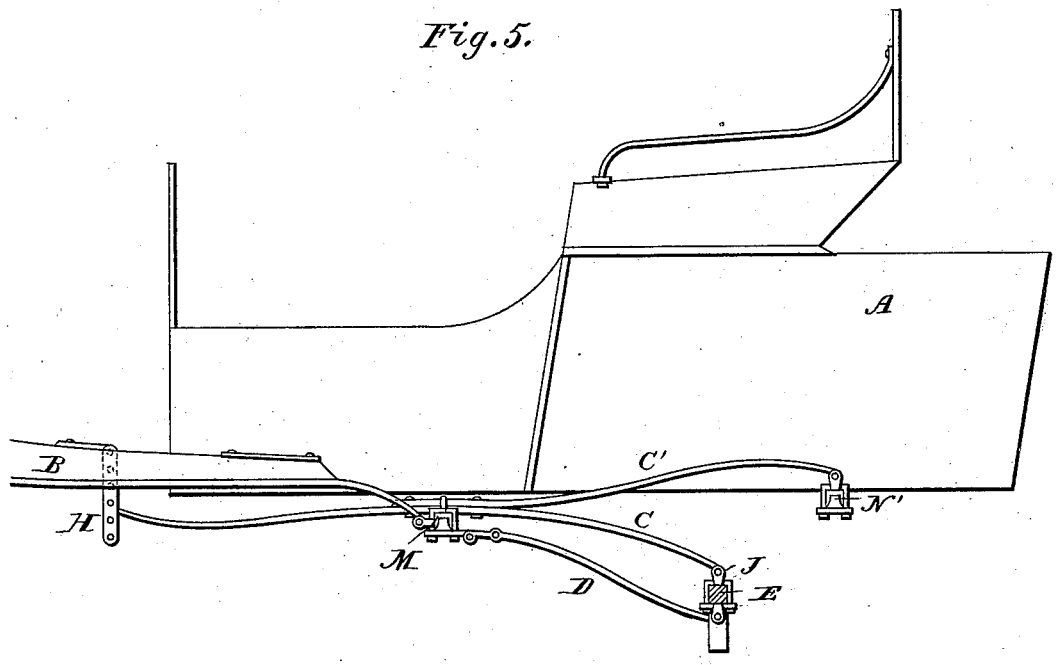
Figure 6:
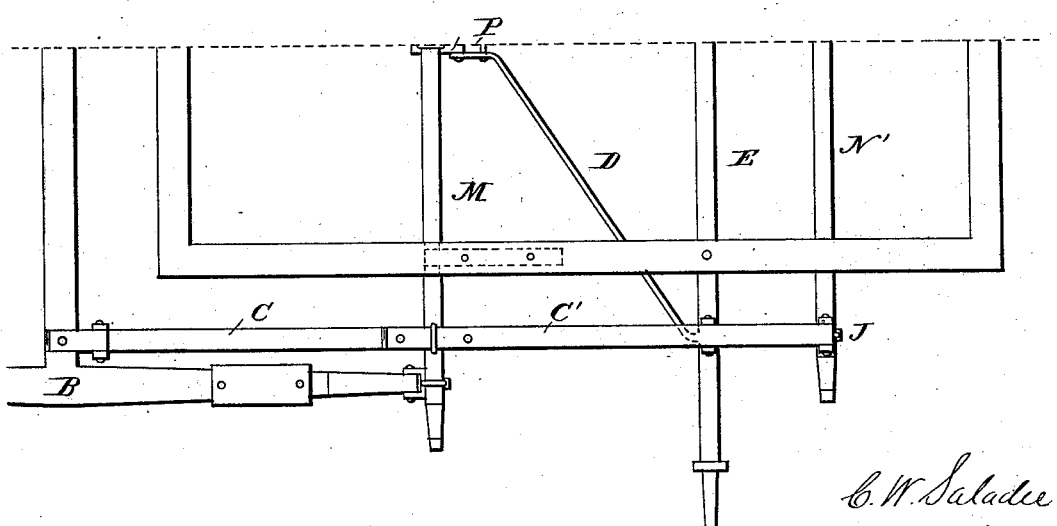

In Figs. 5 and 6 a straight body is shown upon the same platform represented in Figs. 3 and 4, but with the side spring, C, shortened and the body carried farther back over the axle. In this modification the rear end of the body is suspended by a cross-bar, N', from the opposite ends of springs or braces C', and the front end of the body is pivotally secured to the cross-bar M.

I claim—

1. In a two-wheeled vehicle, a spring-platform supporting the body, and connected to the axle at the rear end, and to the shaft-frame at the forward end, the shaft-frame being connected to the platform, substantially as set forth.

2. The combination of the spring-platform, axle at the rear thereof, and a vertically-adjustable connection between the front end and shaft-frame, substantially as set forth.

3. The combination of the axle, spring-platform connected at the rear to said axle, and at the front to the shaft-frame, the shaft-frame being pivoted to the platform, and braces D, substantially as set forth.

4. The combination of the spring-platform, connected at its rear end to an axle, body supported by the platform, and shaft-frame pivoted to the platform at the rear, and attachments connecting the front end of the platform to the shaft-frame, substantially as set forth.

5. In a two-wheeled vehicle, semi-elliptic side springs having their rear ends secured to the axle, and the front ends to the shaft-frame, a body carried by the springs in advance of the axle, and the shaft-frame having the rear end pivotally connected to the springs, substantially as described.

6. In a two-wheeled vehicle, semi-elliptic side springs extended from the axle to the shaft or pole frame, in combination with a spring or brace extended rearward to support the rear of the body, substantially as and for the purpose set forth.

7. In a two-wheeled vehicle, the combination, with the axle and a phaeton or drop front body, of semi-elliptic side springs, C, extended from the axle to the shaft or pole frame, a spring or brace, C', extended rearward, and arms S, connected to the drop-front of the body, substantially as set forth.

8. In a two-wheeled vehicle, the side springs, C, extended from the axle to the shaft or pole frame, cross-bar M, and diagonally-arranged axle-stays D, having their front ends pivotally connected to the center of the platform, and their rear ends, F, shackled to the axle at widely-separated points, substantially as and for the purpose set forth.

In testimony whereof I have signed my name to this specification in the presence of two subscribing witnesses.

CYRUS W. SALADEE.

Witnesses:
   CHAS. L. McNEIL,
   A. E. HANSMANN.